United States Patent
Guy et al.

(10) Patent No.: US 10,210,214 B2
(45) Date of Patent: Feb. 19, 2019

(54) SCALABLE TREND DETECTION IN A PERSONALIZED SEARCH CONTEXT

(71) Applicant: International Business Machines Corporation, Armonk, NY (US)

(72) Inventors: Ido Guy, Haifa (IL); Anat Hashavit, Haifa (IL); Gilad Kutiel, Zihron Yakov (IL); Roy Levin, Zihron Yakov (IL); Tal Steier, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 415 days.

(21) Appl. No.: 14/469,597

(22) Filed: Aug. 27, 2014

(65) Prior Publication Data

US 2016/0063071 A1 Mar. 3, 2016

(51) Int. Cl.
*G06F 17/30* (2006.01)

(52) U.S. Cl.
CPC .... *G06F 17/30516* (2013.01); *G06F 17/3053* (2013.01); *G06F 17/30554* (2013.01); *G06F 17/30864* (2013.01); *G06F 17/30867* (2013.01)

(58) Field of Classification Search
None
See application file for complete search history.

(56) References Cited

U.S. PATENT DOCUMENTS

| 7,240,049 | B2 | 7/2007 | Kapur |
| 8,655,906 | B1 | 2/2014 | Kuraoka et al. |
| 2003/0135490 | A1* | 7/2003 | Barrett .............. G06F 17/30867 |
| 2007/0100875 | A1* | 5/2007 | Chi ......................... G06Q 30/02 |
| 2011/0258185 | A1* | 10/2011 | Acharya ........... G06F 17/30864 |
| | | | 707/725 |
| 2011/0314007 | A1 | 12/2011 | Dassa et al. |
| 2012/0072432 | A1 | 3/2012 | Crosa et al. |
| 2012/0323879 | A1 | 12/2012 | Herbert, Jr. et al. |
| 2013/0110823 | A1 | 5/2013 | Su et al. |
| 2013/0159506 | A1 | 6/2013 | Stern et al. |
| 2014/0040281 | A1 | 2/2014 | Spivack et al. |
| 2014/0180826 | A1* | 6/2014 | Boal .................. G06Q 30/0245 |
| | | | 705/14.66 |

(Continued)

OTHER PUBLICATIONS

Jon Kleinberg, "Bursty and Hierarchical Structure in Streams.", Proceedings of the 8th ACM SIGKDD International Conference on Knowledge Discovery and Data Mining, 2002, pp. 91-101.

(Continued)

*Primary Examiner* — Rehana Perveen
*Assistant Examiner* — Raheem Hoffler
(74) *Attorney, Agent, or Firm* — G&A Glazberg Applbaum

(57) ABSTRACT

A computer implemented method, a computerized system and a computer program product for detecting scalable trends in a personalized search context. The computer implemented method comprising obtaining search results matching a search query, wherein the search query is a query defined by a user, wherein the search results comprise occurrences of events, wherein each occurrence is associated with a timestamp. The method further comprises calculating, by a processor, in response to obtaining the search results, trend scores for the events based on the occurrences comprised by the search results. The method further comprises providing an output to the user based on the trend scores.

8 Claims, 2 Drawing Sheets

(56) References Cited

U.S. PATENT DOCUMENTS

Figure 1:
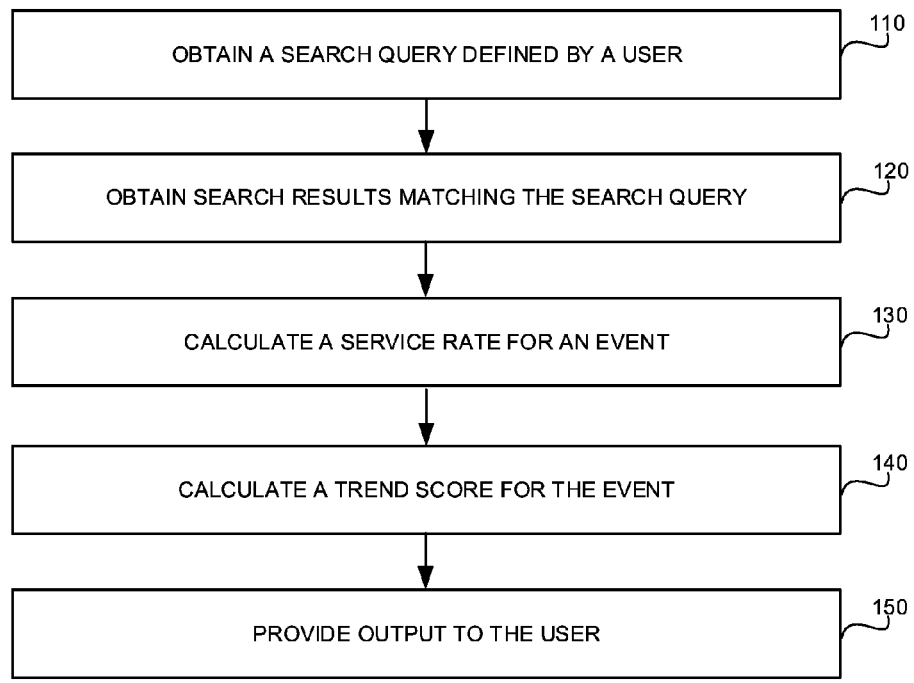

2014/0201227 A1* 7/2014 Hamilton-Dick ............................ G06F 17/30867
707/758
2015/0227624 A1* 8/2015 Busch ............... G06F 17/30982
707/728

OTHER PUBLICATIONS

Jon Kleinberg, "Temporal Dynamics of On-Line Information Streams.", In Data Stream Management : Processing High Speed Data, 2006.

Stanislav Nikolov, "Trend or No Trend: A Novel Nonparametric Method for Classifying Time Series", Thesis, Submitted to the Department of Electrical Engineering and Computer Science, Massachusetts Institute of Technology, Sep. 2012.

Zhang et al., "Discovery of Trending Topics in Microblog Streams Based on Contextual Search", Journal of Computational Information Systems, vol. 10, No. 2, pp. 491-498, 2014.

Lee et al., "FACETLENS: Exposing Trends and Relationships to Support Sense making Within Faceted Datasets", CHI '09 Proceedings of the SIGCHI Conference on Human Factors in Computing Systems, pp. 1293-1302, 2009.

Kairam et al., "Towards Supporting Search Over Trending Events With Social Media", In Proceedings of ICWSM—International Conference on Weblogs and Social Media, Jul. 2013.

\* cited by examiner

SCALABLE TREND DETECTION IN A PERSONALIZED SEARCH CONTEXT

TECHNICAL FIELD

The present disclosure relates to trend analysis in general, and to scalable trend analysis in a personalized search context, in particular.

BACKGROUND

During the examination of a stream of activities, a meaningful increase in the frequency of certain events may be detected. The volume of the event may not always necessarily be of importance, but only the increase in its relative frequency. An event for which the event occurs in an increased frequency may be considered as a trend.

Trend analysis may be the practice of collecting information and attempting to spot a pattern, or trend, in the information. Although trend analysis may often be used to predict future events, it may also be used to estimate uncertain events in the past. Trend analysis may be performed on various types of events. As an example, issued queries to a search engine may be analyzed to spot a trending query. As another example, keywords in new posts to a social media platform may be analyzed to identify trending issues. As yet another example, hashtags in posts, tags in posts, or similar meta data information regarding posts may be analyzed to identify trends. Such analysis may be useful to indicate to a user which issues are currently "hot".

In some exemplary embodiments, an event may be trending even though the number of absolute occurrences is relatively low. As an example, in October 2012, Mr. Felix Baumgartner has jumped from a helium balloon in the stratosphere. The importance of this jump to the public can be ascertained from the occurrences of the search query "felix jump", which had increased significantly for a short period around October 2012. Even at its peak, the volume of searches for "felix jump" was insignificant compared to searches for "Justin Bieber", however, the event is still significant and may be of interest.

BRIEF SUMMARY

One exemplary embodiment of the disclosed subject matter is a computer-implemented method comprising: obtaining search results matching a search query, wherein the search query is a query defined by a user, wherein the search results comprise occurrences of events, wherein each occurrence is associated with a timestamp; in response to obtaining the search results, calculating, by a processor, trend scores for the events based on the occurrences comprised by the search results; and providing an output to the user based on the trend scores.

Another exemplary embodiment of the disclosed subject matter is a computerized apparatus having a processor, the processor being adapted to perform the steps of: obtaining search results matching a search query, wherein the search query is a query defined by a user, wherein the search results comprise occurrences of events, wherein each occurrence is associated with a timestamp; in response to obtaining the search results, calculating trend scores for the events based on the occurrences comprised by the search results; and providing an output to the user based on the trend scores.

Yet another exemplary embodiment of the disclosed subject matter is a computer program product comprising a computer readable storage medium retaining program instructions, which program instructions when read by a processor, cause the processor to perform a method comprising: obtaining search results matching a search query, wherein the search query is a query defined by a user, wherein the search results comprise occurrences of events, wherein each occurrence is associated with a timestamp; in response to obtaining the search results, calculating trend scores for the events based on the occurrences comprised by the search results; and providing an output to the user based on the trend scores.

THE BRIEF DESCRIPTION OF THE SEVERAL VIEWS OF THE DRAWINGS

Figure 2:
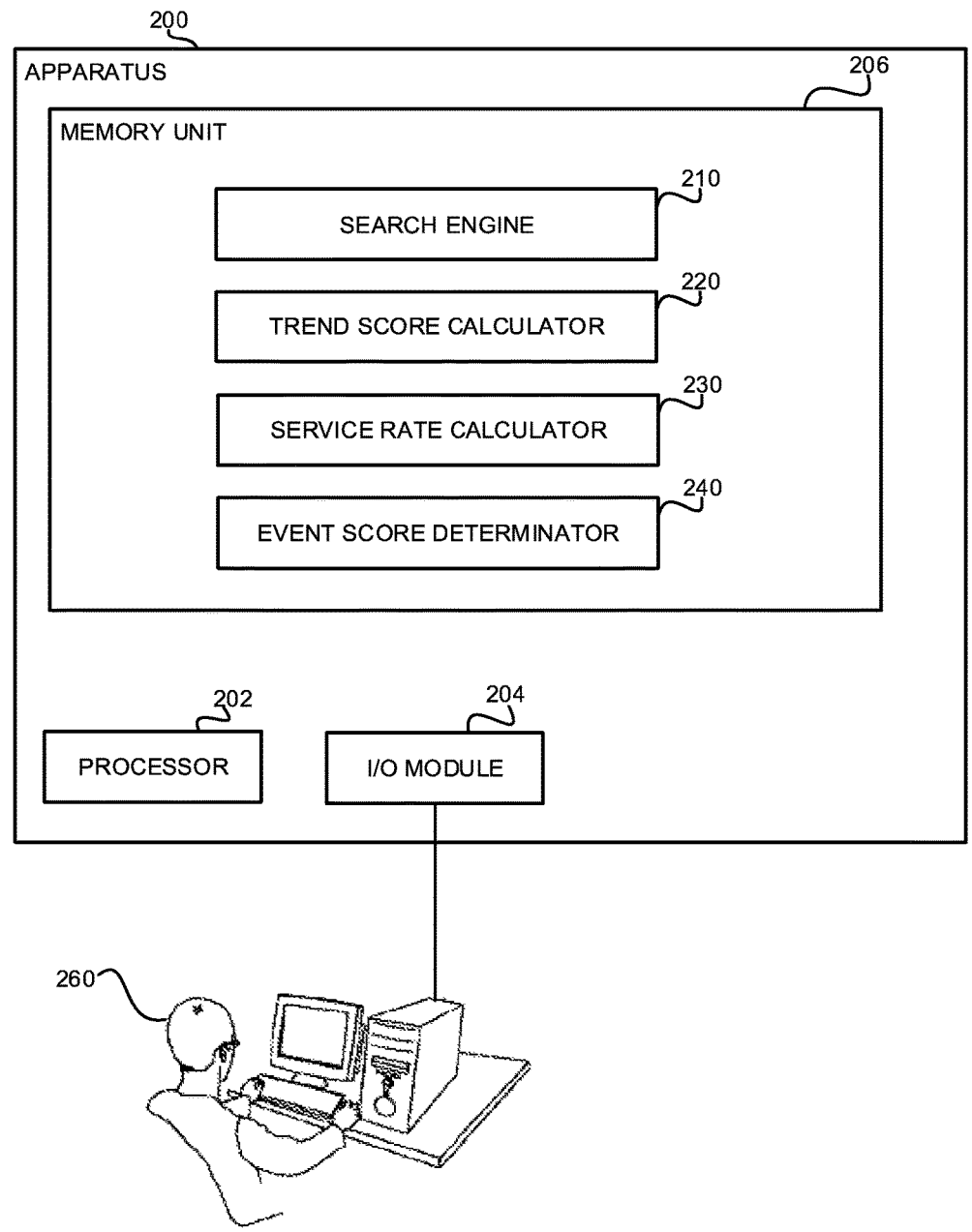

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings:

FIG. 1 shows a flowchart diagram of a method, in accordance with some exemplary embodiments of the disclosed subject matter; and FIG. 2 shows a block diagram of an apparatus, in accordance with some exemplary embodiments of the disclosed subject matter.

DETAILED DESCRIPTION

One technical problem dealt with by the disclosed subject matter is to detect a trend. In some cases, the trend may be detected according to a search query. The search query may be defined by a user. In some cases, detection of the trend may be performed in real time, after the user provides the search query and not through the use of preprocessing.

A trend may be a significant and recent increase in a frequency of an event. The increase in the frequency of the event may be deemed significant according to various factors. Trends may be identifiable to the human eye in an occurrence curve. The occurrence curve may indicate a number of occurrences of an event at different times. Hence, a trend may be viewed as a spontaneous (and potentially non-lasting) spike in the occurrence curve. In some exemplary embodiments, the increase in the frequency of the event may be deemed significant if there is a meaningful change in the occurrence curve of the event. A meaningful change in the occurrence curve may be a change in the slope of the curve of over a predetermined threshold, such as 25%. Accordingly, the recentness of the increase in the frequency of the event may depend on the time units of the occurrence curve. A recent increase may be an increase that occurred in a timeframe of minutes, hours, days, months, years, or the like. As an example, a recent increase in the frequency of an event of a specific hashtag in social networking services, may be an increase in the frequency of the event in a timeframe of an hour or few hours. As another example, in case of an event of a webpage containing a keyword, the timeframe may be measured in days or even months.

One technical solution is to calculate trend scores for events. Calculation of the trend scores may be based on occurrences of the event which match the search query.

In some exemplary embodiments, the occurrences may be provided as search results of the search query. The search results may be obtained from an external source, determined by a search engine, or the like.

In some exemplary embodiments, the calculation of the trend scores may be performed in a linear time with respect to a number of occurrences comprised by the search results. In some exemplary embodiments, the trend scores may be calculated by a single pass on the occurrences comprised by the search results. Furthermore, the calculation of the trend scores may be a real-time calculation. The calculation of the trend scores may be performed after the user provides the search query and not through the use of preprocessing. In some exemplary embodiments, the real-time calculating may be calculation that is performed within a matter of few seconds, within a timeframe that is below a second, two seconds, ten seconds, thirty seconds, one minute, two minutes, or the like.

In some exemplary embodiments, the trend scores may be calculated recursively. In some exemplary embodiments, recursive calculation of the trend scores may be performed based on a recursive formula.

In some exemplary embodiments, the trend score may be computed based on a weighted average of an arrival rate of the event.

One technical effect of utilizing the disclosed subject matter is to detect trending events in a personalized search context. The trend scores within the personalized search context may be used to provide an output to the user based on the trend scores of the events in the personalized search context. The output may be one or more events with highest trend scores. The output may be provided in real time, after the user provides the search query.

In some exemplary embodiments, the trending events may be relevant to social media, such as collaborative projects (for example, Wikipedia™), blogs and microblogs (for example, Twitter), social news networking sites (for example, Digg™ and Leakernet™), content communities (for example, YouTube™ and DailyMotion™), social networking sites (for example, Facebook™), virtual game-worlds (e.g., World of Warcraft™), virtual social worlds (e.g. Second Life™), or the like. In some exemplary embodiments, the trending events may be related to a specific organization.

Yet another technical effect of utilizing the disclosed subject matter is to detect trends without requiring statistics to be maintained for an entire corpus of occurrences. The disclosed subject matter provides for a trend score computation that does not require a-priori knowledge of the entire corpus. By avoiding the need of information relating to the entire corpus, pre-processing may not be required and the trend scores may be computed on demand and in response to a specific request.

Referring now to FIG. 1 showing a flowchart diagram of a method, in accordance with some exemplary embodiments of the disclosed subject matter.

In Step 110, a search query may be obtained. The search query may be defined by a user. In some exemplary embodiments, the search query may have a specific personalized context. In some exemplary embodiments, the search query may define criteria that each item in a corpus may either match or not match. For example, the search query may relate to items containing text, not containing text, having a desired meta-data, or the like.

In Step 120, search results matching the search query may be obtained. In some exemplary embodiments, the search results may comprise items that match the search query from the corpus. The items may be occurrences of events, each associated with a timestamp. In some exemplary embodiments, an event may be a hashtag, and an occurrence may be a search query for the hashtag, a post including the hashtag, or the like. Additionally or alternatively, the event may be a keyword, and an occurrence may be a search for the keyword, a posting of a webpage or a post containing the keyword, or the like.

In some exemplary embodiments, the search results may be obtained from an external source, such as a search engine, or computed independently of an external source. Additionally or alternatively, the search results may be obtained by filtering the corpus from each item that does not match the search query. In some exemplary embodiments, the search results may be obtained by using faceted search technique. The faceted search may apply the search on one or more facets of the items. Facets may correspond to properties of the items, such as derived by analysis of the item or from pre-existing fields in the item (e.g., author, descriptor, language, and format). The result of the faceted search of the items may provide two facets relating to the same item. The facets may relate to the events. As an example, in case the events are hashtag, the facets may be hashtags appearing in a post. A single post may include more than a single hashtag and therefore may be represented by two hashtag facets. Additionally or alternatively, the faceted search may be a search for more than a single facet type, such as a search for both hashtags and keywords.

The occurrences comprised by the search results may comprise occurrences of event related to the search query. The occurrences may comprise, for example, occurrences of noun-phrases in sentences. Additionally or alternatively, the occurrences may comprise occurrences of social entities such as communities, blog entries, wild pages, or the like. In some exemplary embodiments, the occurrences may comprise occurrences of general events.

In some exemplary embodiments, the occurrences of the events may be filtered based on a timeframe. Different time units may be inferred or used for different search queries. In some exemplary embodiments, the time units may be hours, weeks, months, years, or the like. As an example, if the search query is related to a social media entities like tweets, relevant occurrences of the events may be occurrences in a time frame of an hour, few hours, a day, or the like.

In Step 130, a service rate for an event may be calculated. The service rate may denote the rate at which occurrences of the event appear in the search results. In some exemplary embodiments, the service rate may be a weighted average of an arrival rate of the event. The arrival rate of the event may refer to the rate at which occurrences of the event appear in the search result. In some exemplary embodiments, the service rate may be an exponential weighted average.

In some exemplary embodiments, calculating the service rate may comprise recursive calculating, i.e. calculating service rate at a specific time point based on service rates calculated for preceding time points.

In some exemplary embodiments, calculating the service rate may be based on a score of the event. The score of the event may be determined based on the occurrences of the event comprised by the search results. The score of the event may be a measurement indicating an intensity of the occurrence. As an example, the score may be a number between zero and one, where zero indicates no intensity (e.g., no occurrence for the event) and one indicates a full intensity (e.g., a clear occurrence of the event). In some cases, measurements between zero and one may be associated with occurrences that relate to the event indirectly, occurrences that are less visible (e.g., published within a private network), or the like. As another example, the score of the event may be either the value one if there is an occurrence of the event in the search results, and zero otherwise.

In some exemplary embodiments, the service rate may be calculated based on the following formula:

$$serviceRate(t,i) = \alpha \cdot serviceRate(t,i-1) + (1-\alpha) \cdot eventScore$$

serviceRate(t, i) may be the service rate of an event t at time i, serviceRate(t, i−1) may be the service rate of event t at time i−1, α may be a parameter. α may be a constant number describing how much weight to assign to the occurrences of the event at time i with respect to the preceding occurrences that occurred prior to time i. In some exemplary embodiments, a may be a number between zero and one.

In some exemplary embodiments, the service rate may be calculated based on the following formula:

$$serviceRate(t,i) = \alpha^d \cdot serviceRate(t,i-d) + (1-\alpha) \cdot eventScore$$

i may be a time of an occurrence of event t, i−d may be a time of a preceding occurrence of event t. No additional occurrences of the event t may be between the occurrence and the preceding occurrence.

In Step 140, a trend score may be calculated for the event. The trend score of the event may be calculated based on the occurrences comprised by the search results. In some exemplary embodiments, the trend score may be calculated using the service rate of the event.

In some exemplary embodiments, the trend scores may be calculated recursively. The trend scores may be calculated based on a recursive formula. In some exemplary embodiments, the recursive formula may calculate a trend score of an event at a specific time based on the trend score for the event at a previous time. The recursive formula may calculate a trend score of the event at time i based on the occurrences at and before time i.

In some exemplary embodiments, the recursive formula may be:

$$trendScore(t,i) = \beta \cdot trendScore(t,i-1) + eventScore - serviceRate$$

trendScore(t, i) may be the trend score of event t at time i, trendScore(t, i−1) may be the trend score of event t at time i−1, eventScore may be the score of event t, serviceRate may be the service rate of the event t calculated in Step 130, and β may be a constant number describing the decay of the event, e.g., how fast an existing trend may fade. In some exemplary embodiments, β may be a parameter whose value may be between zero and one.

In some exemplary embodiments, the recursive formula may be:

$$trendScore(t,i) = \beta \cdot trendScore(t,i-d) + eventScore - serviceRate \cdot (GeometricSum(\alpha,d-1)+1)$$

GeometricSum(α, d−1) may be a geometric sum of a geometric series. The common ratio of the geometric sum may be the constant number a, and a first term of the geometric series may be d−1.

In some exemplary embodiments, the trend score may be calculated in a linear time with respect to a number of the occurrences comprised by the search results. The time complexity of the computation of the trend score may be O(n).

In some exemplary embodiments, the trend score may be calculated in real time. In some exemplary embodiments, the trend score may be calculated within a timeframe of less than ten minutes.

In some exemplary embodiments, the trend score may be calculated by a single pass on the occurrences comprised by the search results. In some exemplary embodiments, trend scores of different events may also be calculated by a single pass.

In Step 150, an output may be provided to the user. The output may be based on trend score calculated in Step 140. The output may be an indication of the trend score of the event. In some exemplary embodiments, steps 130-140 may be performed to compute trend scores for a plurality of events. The output may be one ore more event with highest trend scores, thereby providing "top trending" events within the context of the query.

Referring now to FIG. 2 showing an apparatus in accordance with some exemplary embodiments of the disclosed subject matter. An Apparatus 200 may be configured to detect trending events in response to a search query, in accordance with the disclosed subject matter.

In some exemplary embodiments, Apparatus 200 may comprise a Processor 202. Processor 202 may be a Central Processing Unit (CPU), a microprocessor, an electronic circuit, an Integrated Circuit (IC) or the like. Processor 202 may be utilized to perform computations required by Apparatus 200 or any of it subcomponents.

In some exemplary embodiments of the disclosed subject matter, Apparatus 200 may comprise an Input/Output (I/O) Module 204. I/O Module 204 may be utilized to provide an output to and receive input from a User 260. In some exemplary embodiments, I/O Module 204 may be utilized to receive the search query from User 260. Additionally, I/O Module 204 may utilized to receive search results from User 260.

In some exemplary embodiments, Apparatus 200 may comprise a storage Device 206. Storage Device 206 may be a hard disk drive, a Flash disk, a Random Access Memory (RAM), a memory chip, or the like. In some exemplary embodiments, Storage device 206 may retain program code operative to cause Processor 202 to perform acts associated with any of the subcomponents of Apparatus 200.

In some exemplary embodiments, a Search Engine 210 may be configured to provide search results matching the search query, such as provided by User 260. Search Engine 210 may search for the results in a corpus of items. In some exemplary embodiments, the search results may comprise occurrences of events that match the search query. Each occurrence may be associated with a timestamp. In some exemplary embodiments, Search Engine 210 may be a faceted search engine. In some exemplary embodiments, In some exemplary embodiments, a Trend Score Calculator 220 may be configured to calculate trend scores for the events. Calculating the trend scores may be based on the occurrences comprised by the search results. In some exemplary embodiments, Trend Score Calculator 220 may calculate the trend scores recursively, based on a recursive formula. In some exemplary embodiments, the recursive formula may be based on calculating a service rate for the events. Additionally or alternatively, the recursive formula may involve characteristics of the event. A characteristic of the event may be a score of the event.

In some exemplary embodiments, a Service Rate Calculator 230 may be configured to calculate the service rate for the event. The service rates computed by Service Rate Calculator 230 may be used by Trend Score Calculator 220 to compute trend scores.

In some exemplary embodiments, an Event Score Determinator 240 may be configured to determine an event score for an event. In some cases, the event score may be either zero or one depending on whether there's an occurrence of the event at a specified time. The event scores may be used by Service Rate Calculator 230 to compute service rates and/or by Trend Score Calculator 220 to compute trend scores.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method comprising:
    obtaining search results matching a search query, wherein the search query is a query defined by a user, wherein the search results comprise occurrences of events, wherein each occurrence is associated with a timestamp;
    in response to obtaining the search results, calculating, by a processor, trend scores for the events based on the occurrences comprised by the search results, wherein said calculating comprises recursively calculating the trend scores for the events using a formula recursive in time, whereby a trend score of an event at a specific time is based on the trend score for the event at a previous time, and on a weighted average of an arrival rate of the event at the specific time; and
    providing an output to the user based on the trend scores, wherein computation of the trend score has complexity of O(n) wherein n is a number of the occurrences comprised in the search results, and
    wherein said recursive calculating is based on the following recursive formula:

$$\text{trendScore}(t, i) = \beta \cdot \text{trendScore}(t, i-1) + \text{eventScore} - \text{serviceRate}(t, i),$$

wherein t is an event, wherein i is a time, wherein trendScore(t,i) is a trend score of the event at time i based on the occurrences at and before time i, wherein eventScore is a score of the event at time i based on occurrences of the event at time i, wherein serviceRate is the weighted average of the arrival rate of the event t at time i, and wherein $\beta$ is a constant.

2. The computer implemented method of claim 1, wherein a calculation duration of said calculating is less than one minute.

3. The computer-implemented method of claim 1, wherein said calculating is performed by a single pass on the occurrences comprised by the search results.

4. The computer implemented method of claim 1 further comprises filtering the occurrences of the events based on a timeframe.

5. A computerized apparatus having a processor, the processor being adapted to perform the steps of:
    obtaining search results matching a search query, wherein the search query is a query defined by a user, wherein the search results comprise occurrences of events, wherein each occurrence is associated with a timestamp;
    in response to obtaining the search results, calculating trend scores for the events based on the occurrences comprised by the search results, wherein said calculating comprises recursively calculating the trend scores for the events using a formula recursive in time, whereby a trend score of an event at a specific time is based on the trend score for the event at a previous time, and on a weighted average of an arrival rate of the event at the specific time; and
    providing an output to the user based on the trend scores, wherein computation of the trend score has complexity of O(n) wherein n is a number of the occurrences comprised in the search results, and
    wherein said recursive calculating is based on the following recursive formula:

$$\text{trendScore}(t, i) = \beta \cdot \text{trendScore}(t, i-1) + \text{eventScore} - \text{serviceRate}(t, i),$$

wherein t is an event, wherein i is a time, wherein trendScore(t,i) is a trend score of the event at time i based on the occurrences at and before time i, wherein eventScore is a score of the event at time i based on occurrences of the event at time i, wherein serviceRate is the weighted average of the arrival rate of the event t at time i, and wherein $\beta$ is a constant.

6. The computerized apparatus of claim 5, wherein a calculation during of said calculating is less than one minute.

7. The computerized apparatus of claim 5, wherein said calculating is performed by a single pass on the occurrences comprised by the search results.

8. A computer program product comprising a computer readable storage medium retaining program instructions, which program instructions when read by a processor, cause the processor to perform a method comprising:
    obtaining search results matching a search query, wherein the search query is a query defined by a user, wherein the search results comprise occurrences of events, wherein each occurrence is associated with a timestamp;
    in response to obtaining the search results, calculating trend scores for the events based on the occurrences comprised by the search results, wherein said calculating comprises recursively calculating the trend scores for the events using a formula recursive in time, whereby a trend score of an event at a specific time is based on the trend score for the event at a previous time, and on a weighted average of an arrival rate of the event at the specific time; and
    providing an output to the user based on the trend scores, wherein computation of the trend score has complexity of O(n) wherein n is a number of the occurrences comprised in the search results, and
    wherein said recursive calculating is based on the following recursive formula:

$$\text{trendScore}(t, i) = \beta \cdot \text{trendScore}(t, i-1) + \text{eventScore} - \text{serviceRate}(t, i),$$

wherein t is an event, wherein i is a time, wherein trendScore(t,i) is a trend score of the event at time i based on the occurrences at and before time i, wherein eventScore is a score of the event at time i based on occurrences of the event at time i, wherein serviceRate is the weighted average of the arrival rate of the event t at time i, and wherein $\beta$ is a constant.

* * * * *